Dec. 18, 1962 J. L. NEWMAN 3,068,579
LINE MEASURING AND MOVEMENT INDICATING DEVICE
Filed Sept. 3, 1959 3 Sheets-Sheet 1
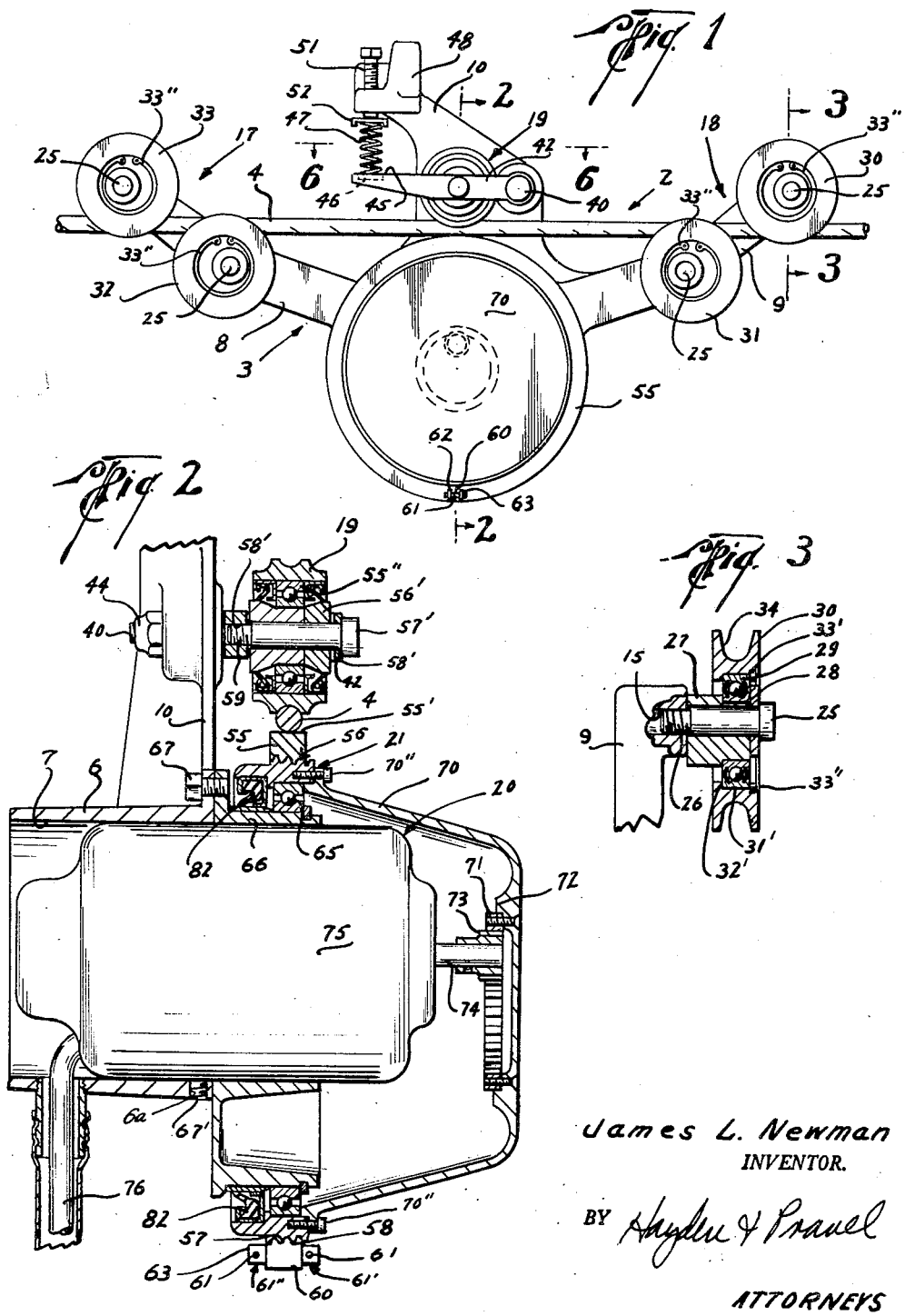
James L. Newman
INVENTOR.
BY Hayden & Pravel
ATTORNEYS Dec. 18, 1962 J. L. NEWMAN 3,068,579
LINE MEASURING AND MOVEMENT INDICATING DEVICE
Filed Sept. 3, 1959 3 Sheets-Sheet 2
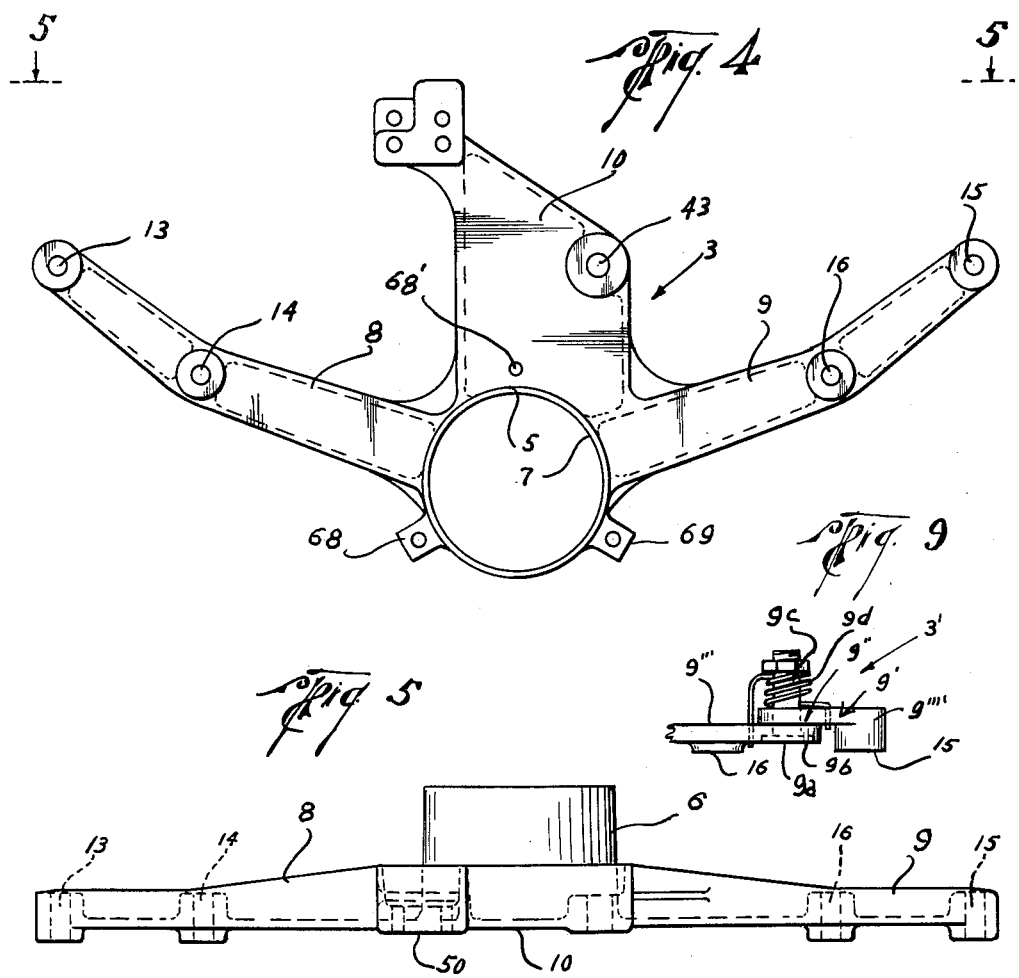
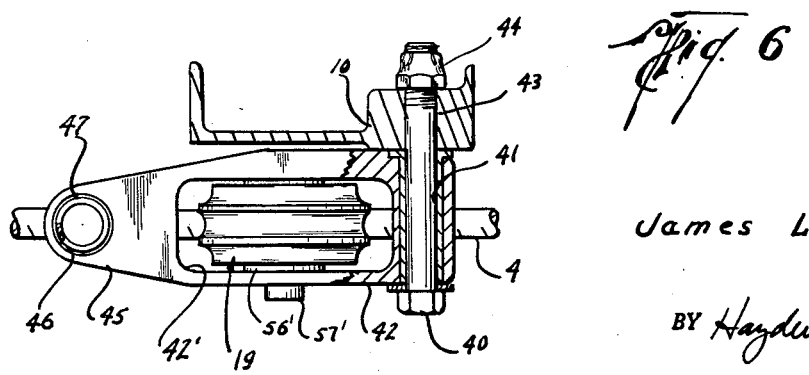
James L. Newman
INVENTOR.
BY Hayden & Pravel
ATTORNEYS

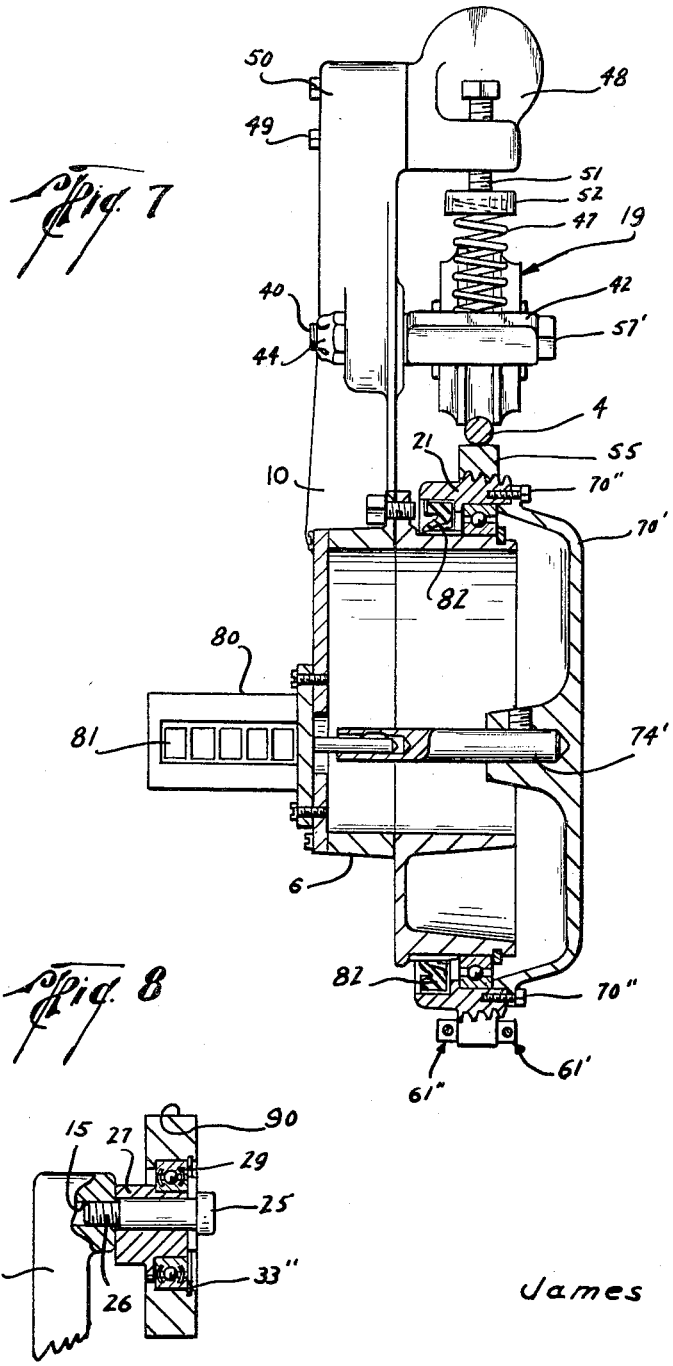

United States Patent Office 3,068,579
Patented Dec. 18, 1962

3,068,579
LINE MEASURING AND MOVEMENT
INDICATING DEVICE
James L. Newman, Houston, Tex., assignor to Bowen-Itco, Inc., Houston, Tex., a corporation of Texas
Filed Sept. 3, 1959, Ser. No. 837,894
11 Claims. (Cl. 33—134)

The present invention relates to a line measuring and movement indicating device.

Various devices have been proposed for the measurement of wire line, rope and similar types of material; however, a great deal of difficulty is encountered in devices of this type in that mechanisms of this type which are presently employed do not satisfactorily measure wire line, cable, rope and the like to the degree of accuracy desired. Also, a great deal of difficulty is encountered in that the devices presently employed tend to damage the line to such an extent that its useful life is greatly shortened. The above difficulties are caused because the devices presently employed to measure line, such as wire line, cable, rope and the like employ a pressure loaded device, such as a spring loaded wheel which engages the line as it is unreeled so that rotation is imparted to the wheel, and the measurement of the amount of wheel movement is used as a determination of the amount of line unreeled.

The pressure loaded, or spring loaded wheel or other similar mechanism which engages the line and measures the line as it is being unreeled must continuously engage the line at all times, and the amount of pressure utilized to accomplish this, or the construction employed, may cause the line to bow or bend in an arc. The bending of the line introduces an error in the measurement because the pressure loaded device urged thereagainst is, in effect, measuring the inner circumference of an arc transcribed by the line as the line moves across the spring loaded roller or mechanism, and this is not the true lineal measurement of the line.

Also, the pressure against the line in some circumstances at the present time is great enough to flatten, or otherwise damage the line. This is undesirable in that it may greatly reduce the useful life of the line, and may introduce further error in the measurement of the line as it moves through the measuring mechanism.

Additionally, it may be desirable under some circumstances to accurately indicate the linear movement of a line, and to in turn relate this linear movement to actuate or operate other equipment in synchronism, or in response to linear movement of the line. At the present time, it is extremely difficult, if not impossible, with devices presently employed to accomplish this function.

An object, therefore, of the present invention is to overcome the above and other problems and disadvantages in the measuring and movement indicating devices.

It is characteristic or at least not unusual for multi-strand cable to be worn at some intervals in its length more than at other places, and the present invention provides a construction wherein cable may be accurately measured even though it may have worn spots therein.

Still another object of the present invention is to provide a device for accurately measuring wire line, cable, rope and the like without damaging it.

Yet a further object of the present invention is to provide a device for accurately indicating the linear movement of a wire line, cable, rope or the like.

Still a further object of the present invention is to provide a device for maintaining a wire line, cable, rope or the like in substantially a straight line as it is moved through an indicating or measuring device to inhibit damage to the line, and to obtain a more accurate measurement of the line as it is unreeled.

Yet a further object of the present invention is to provide a device for accurately measuring or indicating the movement of a line, which device can be readily adapted to fit wire line, cable, rope and similar material of different diameter.

Yet a further object of the present invention is to provide a device for accurately indicating linear movement of a wire line, and transmitting this indication to a location remote from the indicating device.

Another object of the present invention is to provide a device which can be readily and easily adjusted to measure the length of wire line of any desired or predetermined diameter.

Still a further object of the present invention is to provide a device for aligning and supporting a line in a predetermined position as it is being measured.

Still another object of the present invention is to support a line, such as a cable or the like in a straight line in order to obtain an accurate linear measure of the line.

A further object of the present invention is to provide a measuring device for line which includes an adjustable wheel to compensate for wear in the device and improper manufacturing tolerances.

Other objects and advantages of the present invention will become more readily apparent from a consideration of the following description and drawings wherein:

FIG. 1 is a front view illustrating the device of the present invention with a wire line positioned therein;

FIG. 2 is a sectional view, partly in elevation, on the line 2—2 of FIG. 1 to illustrate further structural details;

FIG. 3 is a sectional view on the line 3—3 of FIG. 1 showing in greater detail a manner of mounting the guide wheels on the frame of the present invention;

FIG. 4 is a front elevation illustrating the frame of the present invention;

FIG. 5 is a top plan view on the line 5—5 of FIG. 4;

FIG. 6 is a sectional view on the line 6—6 of FIG. 1, partly in section, illustrating the manner of supporting the spring loaded roller of the device of the present invention;

FIG. 7 is a view similar to FIG. 2 and illustrates a different type of indicating or measuring means which may be employed with the present invention;

FIG. 8 is a sectional view similar to FIG. 3 and illustrating an alternate form of guide roller; and FIG. 9 is a view illustrating another form of the frame of the present invention.

In FIG. 1 of the drawings, the invention is illustrated generally by the reference numeral 2. The device includes a frame designated generally at the numeral 3, which frame is best illustrated in FIG. 4, and is shown as including a central portion 5 having a hub, or annular projection 6 which defines an opening 7 in the central portion 5 of the frame 3 for a purpose as will be described in greater detail hereinafter.

Arms 8 and 9 extend from each side of the central portion 5 as illustrated in FIG. 4 of the drawings generally outwardly and upwardly relative to the central portion 5 of the frame 3. A bracket 10 extends upwardly from the central portion 5, and as more clearly seen in FIG. 5 of the drawing, the bracket 10 as well as the arms 8 and 9 extend substantially in the same vertical plane from the central portion 5 of the frame 3. In the drawings, the central portion 5, bracket 10, and arms 8 and 9 are shown as being integrally formed; however, they may be formed in any suitable manner and from any suitable material.

Each arm 8 and 9 is provided with upper and lower threaded openings 13, 14 and 15, 16 respectively for receiving the paired guide rollers designated generally at 17 and 18 in FIG. 1 of the drawings. The paired guide rollers 17 and 18 aid in guiding and supporting the line 4 in the device 2 as the line is being measured. The bracket 10 forms a support for a spring loaded guide roller illustrated generally at 19, which guide roller abuts the cable 4 and urges the cable 4 against the member 21 carried on the central portion 5 of the frame 3. The opening 7 in the central portion 5 of the frame 3 receives an indicating or measuring means as represented generally by the numeral 20 and the measuring or indicating means 20 is operatively connected with the movable member 21 so that as the cable 4 is moved through the paired rollers 17 and 18, it is urged into engagement with the annular member 21 by the spring loaded roller 19 whereupon the indicating or measuring means illustrated generally at 20 is actuated to indicate the movement of the line 4.

In FIG. 3 the details of the manner of arrangement of the guide rollers on the arms 8 and 9 is illustrated. It will be noted that a pin 25 is threaded on one of its ends as illustrated at 26 for engaging in the threaded openings 13, 14, 15 and 16 of the arms 8 and 9. An eccentric 27 is slidably carried by the pin 25, the eccentric 27 being provided with an annular groove 28 in which the roller bearing 29 is mounted. The roller bearing 29 is in turn seated in the bore 31' of the roller 30 and rests on the shoulder 32' formed in the bore 31'. A snap or lock ring 33" seats in groove 33' in bore 31' and abuts the roller bearing 29 so as to position the roller bearing 29 and guide roller 30 for movement together. It will be noted in FIG. 3 that the roller 30 may be provided with an annular groove as illustrated at 34 for engaging the cable, wire line, rope or the like.

Each of the rollers 31, 32 and 33 may be constructed in a manner similar to that described with regard to guide roller 30, and each may also be arranged in position on the arms 8 and 9 in a manner as described with reference to guide roller 30. It should be noted that the length of the eccentric 27 which supports the rollers 30, 31, 32 and 33 in spaced relation to the frame 3 are all of the same axial extent so that the guide rollers will lie in the same vertical plane. This aids in eliminating flexing or bending of the cable as it moves through the paired guide rollers 17 and 18. Also, the spring loaded roller 19 is supported in spaced relation relative to the frame 3 so that it will also be in the same vertical plane as the paired guide rollers 17 and 18 so the cable or wire line, or rope, as illustrated at 4, is not distorted or flexed vertically or laterally as it moves through the measuring device.

The spring loaded roller 19 is carried by the bracket 10 and the arrangement of the spring loaded roller 19 may be as illustrated in FIGS. 1, 6 and 7 of the drawings. In FIG. 6 a bolt 40 extends through the opening 41 in the enlarged end of the carriage 42, the opening 41 being greater in diameter than the diameter of the bolt 40 so that the carriage 42 is pivotally supported or carried on the bolt 40. The bolt 40 extends through the opening 43 in bracket 10 and is secured by the nut 44 so as to support the carriage 42 above the cable 4 as shown in FIGS. 1, 2 and 7. The carriage 42 is provided with a surface 45 at the end opposite the bolt 40, the surface 45 having the depression 46 therein in which one of the ends of the spring 47 is adapted to seat. The other, or top end of the spring 47 is abutted against pressure plate 52 which may be provided with a depending annular flange to fit around and retain the spring in position in the device. A screw 51 abuts the plate 52 and the screw 51 is in turn threadedly engaged in the support 48 positioned on the upper end 50 of the bracket 10 by any suitable means such as screws 49. This arrangement can best be seen in FIG. 7 of the drawings.

The pressure of the spring 47 may be varied by the turning of the screw 51 to move longitudinally of the opening in the support 48, thus increasing or decreasing the pressure of the plate 52 on the spring 47 and thereby increasing or decreasing the spring pressure on the surface 45 of the carriage 42. The carriage 42 is provided with an opening 42' in which is received the roller 19, and the amount of pressure exerted by roller 19 on line 4 can be varied by adjusting the tension in spring 47.

As more clearly illustrated in FIG. 2 of the drawings, the roller 19 is mounted on the roller bearing 55", and the bearing is in turn carried by the support 56', which support is secured in position in the carriage 42 by reason of the bolt 57' which extends through the openings 58' of each side of the carriage and is threadedly engaged as illustrated at 59 in the carriage to hold the roller in place therein.

It should be noted at this point that the amount of pressure urged on line 4 by the roller 19 will be sufficiently great so as to urge the line into engagement with the ring or edge portion 55 carried on the annular member 21 so that as the line moves between the roller 19 and the edge portion 55, movement or rotation will be imparted to the annular member 21. However, it is desirable that the amount of pressure exerted by the roller 19 not be sufficient to damage or cut the line and therefore the amount of pressure can be varied as desired by means of the screw 51 in a manner as described hereinabove.

When the line 4 is initially positioned in the frame 3 of the device 2, each of the rollers 30, 31 and 32, 33 is adjusted so that they, in cooperation with the roller 19 and annular edge portion 55, will support the line in substantially a straight line as it moves longitudinally of the frame 3. This may be accomplished by unscrewing the pins 25 so as to permit the eccentrics 27 on each of the rolls 30, 31, 32 and 33 to be adjusted so that the rollers respectively supported thereby will engage the adjacent surface of the cable or wire line in a straight line. Also, the roller 19, and the edge portion 55 are also adjusted so that they will be spaced apart a predetermined or desired distance so as to engage the opposite sides of the cable 4 with the proper amount of pressure so as to drive the annular member 21 without damaging the line. The roller 30, the spring loaded roller 19, as well as the roller 33 all engage the same side of the wire line 4, and all engage it in a straight line longitudinally of the frame 3. Also, the lower roller 31, and the lower roller 32 as well as the annular edge portion 55 contact the opposite side of the line 4 and also contact it in a straight line longitudinally of the frame 3. This prevents bending, or undue flexing of the cable 4 and supports it in a straight line as it passes relative to the frame 3 so that a more accurate measurement of the cable may be obtained. Such construction also inhibits damaging the line by exerting undue pressures thereon.

Of course, after each of the eccentrics has been adjusted, or rotated relative to the pin 25 on which it is supported so as to in turn vary the vertical spacing between the rollers 32, 33 and rollers 31, 30 the pin 25 is tightened so as to retain its eccentric in this position while the wire line, rope, cable or the like or any given or predetermined diameter is being moved through the device.

It is necessary, as previously noted, to align the lower rollers 31 and 32 and the edge portion 55 so that the line 4 is contacted in the same horizontal plane by all three members. Therefore, if the members 31 and 32 are adjusted vertically, then the edge portion 55 will also have to be adjusted accordingly so that it will lie in the same longitudinal plane as the rollers 31 and 32. Additionally, it is impossible, for all practical purposes, in manufacturing to cut, or machine the edge portion 55 to a predetermined desired circumferential length. In order to obtain an accurate measurement of the line 4, it is necessary to know the circumference of the ring 55, and to maintain this measurement as the device is being used. When the circumferential length of the edge portion 55 is known, and is maintained, during use of the measuring device, then the movement of the edge portion, or the rotation of the edge portion, may be related to the measuring device 20 in a manner so that an accurate measurement or indication of linear movement of the line 4 may be obtained when the ring 55 is rotated.

For example, the circumferential length of the ring 55 may be any desired amount; however, for purposes of illustration or example, it will be assumed that the circumferential length of the edge portions 55 is to be three feet, so that one complete revolution of the ring portion 55 by reason of the line 4 contacting the ring and rotating it, will measure three feet of line passing through the device 2.

Since, as previously noted, it is extremely difficult, if not impossible, to manufacture a ring having this exact circumference, and to maintain this exact circumferential length throughout the life of the device 2, suitable means may be provided whereby the circumferential length of the edge portion 55 may be adjusted or changed as required in order to maintain a predetermined length. Therefore, as wear of the edge portion occurs, its length may be adjusted so that as nearly as possible it will retain its original desired or predetermined circumferential length.

In order to obtain this result, cooperating means designated generally at 56 are provided on the edge portion 55 and annular member 21 whereby the ring or edge portion 55 may be adjusted relative to the member 21 in order to maintain alignment with the rollers 31 and 32, and in order to maintain the predetermined or desired circumferential length of the annular edge portion 55.

As illustrated in the drawings, the means 56 may be in the form of an annular tapered thread 57 on the member 21 and a mating annular tapered thread 58 on the ring 55. The ring 55 is split as illustrated at 60 so that the ring 55 may expand and contract radially as it is threaded or moved relative to the annular member 21 on which it is supported. A clamp means 61' in the form of a bolt 61 threaded through the brackets 62 and 63 on each side of the split 60 in the ring 55 enables the ring 55 to be clamped at any predetermined adjusted position on the annular member 21. As illustrated in the drawings, clamp means may be provided on each side of the ring 55 as shown at 61' and 61". As a practical matter, the split 60 may be formed by removing a small segment of the ring, so that the ring may be adjusted to expand or contract relative to its normal diameter.

In order to adjust the annular edge portion 55 relative to the annular member 21, the clamp means 61' and 61" are loosened by unthreading bolt 61 relative to bracket 62, 63 so that the annular edge portion or ring 55 may tend to spread apart. Thereafter, the edge portion 55 may be threaded manually relative to the member 21 until the desired amount of adjustment of ring 55 is attained. Since the cooperation means 56 is in the form of an annular tapered thread on the ring 55 and annular member 21 respectively, it can be appreciated that the serrated surface 55' will remain horizontally aligned at all times so as to properly receive and support the line 4 thereon. After the adjustment of ring 55 on the member 21 has been made, the clamp means 61' and 61" may be tightened so as to hold the annular edge portion 55 in position on the annular member 21.

From the foregoing description as to the manner of adjustment of the rollers 30, 31 and the rollers 32, 33 as well as the manner of adjustment of the ring 55, it can be appreciated that the present invention provides a device which can be readily and easily adapted to measure the length of wire line, cable, rope and the like of any predetermined or desired diameter. The rollers 30, 31 and the rollers 32, 33 as well as the roller 19 and ring 55 may be adjusted vertically to receive rope or wire of any predetermined or desired diameter, and to insure that the rollers on each side of the line are aligned horizontally, or longitudinally of the device.

The annular member 21 is secured to or mounted on the ball bearing 65, and the ball bearing 65 is supported on the flanged collar 66. The collar 66 is secured to the central portion 5 of the frame 3 by any suitable means such as the screws 67. A threaded opening 68' is provided in the bracket 10 for the screw 67, and if necessary suitable projections as illustrated at 68 and 69 may be provided on central portion 5 to receive additional screws 67 for securing collar 66 in place thereon.

The annular member 21 is in turn secured to a housing or suitable form of connector as illustrated at 70 so that movement of the annular member 21 may be measured or indicated. For example, after the rollers 30, 31 and 32, and 33, as well as the ring 55 have been adjusted and the line 4 positioned therein with the spring 47 adjusted so as to urge the line 4 into engagement on the ring 55, any movement of the line 4 will cause the ring 55 and annular member 21 connected therewith to rotate. This rotation is in turn imparted to the housing or bracket means 70, and the bracket 70 may be connected to any suitable means for indicating or measuring linear movement of the line 4. The housing 70 is secured to member 21 by any suitable means such as screws 70".

In order to measure line accurately it is necessary to calibrate the device 2. This may be accomplished in one of several ways, such as, for example, a line of known length such as 3 feet in length, may be passed through the device and the ring 55 adjusted so that it makes one complete revolution when 3 feet of line has passed thereover so as to rotate the ring 55 one revolution. When the ring 55 has been adjusted to the position on member 21 so that one rotation of the ring 55 will give a measurement of a known length of line 4, then the clamp means may be tightened so as to hold the ring 55 at this position on the annular member 21. Thereafter, the device may be used to measure line, and, it may be desirable to recalibrate the device 2 from time to time in order to ascertain whether or not accurate line measurements are being obtained. If the outer periphery of the ring 55 tends to become worn, then it will be necessary to adjust the ring 55 relative to the member 21 so that it will still give a linear measurement of the desired length when it rotates one time. If the ring 55 is adjusted, then of course, the rollers 31 and 32 will also have to be readjusted to realign them with the ring 55.

As a practical matter, it is not unusual for a cable to vary in thickness throughout its length. For example, a cable which is 7/16 inch in diameter may actually vary from .400 of an inch to .435 of an inch in thickness. The present invention will accurately measure cable of a given diameter, even though it may vary in diameter as above illustrated.

The rotation of the ring 55 may be related to the indicating means 20 in any suitable manner. For example, in the embodiment of the invention illustrated in FIG. 2 of the drawings, a ring gear 71 is shown as being mounted on the end 72 of the housing or bracket 70, and a pinion 73 is engaged therewith. The pinion 73 is mounted on a shaft 74, and the shaft 74 is in turn connected to the motor (generator) 75 so that as the housing 70 is rotated, the shaft 74 is in turn rotated and since it is connected to the generator 75, this creates an electromotive force. As a practical matter, the gear ratio of the device may be any suitable amount, and for the purposes of illustration, it will be assumed that the gear ratio is such that one rotation of the ring 55 will cause the shaft 74 to make three complete revolutions. The gear arrangement and the manner of mounting indicating means 20 in relation to member 21 greatly increases the accuracy of the present device. In construction presently employed, the indicating means is connected to the movable member by a gear train which tends to introduce error in the measurement of the line.

The motor or generator 75 may be of the selsyn type so that the electrical impulses generated thereby can be transmitted through the conduit 76 so as to correlate linear movement of the line 4 with any other equipment which may be electrically connected by means of the conduit 76 to move in relation to movement of the line 4. In some circumstances, it is desirable to move other equipment or devices in synchronism with, or in relation to the movement of the line 4, and a synchronous motor or device (not shown) connected with the generator 75 by means of the conduit 76 will accomplish this function. If desired, the electrical impulses from the motor 75 may be used to indicate the measurement, or movement of the cable 4 line or the like at some instrument located remote from the device 2.

As shown in the drawings, it will be noted that the motor, or selsyn device 75 is mounted in the opening 7 of the central portion 5 of the frame 3. An externally threaded set screw 67' is threaded in an internally threaded opening 6a in the annular projection 6 so that such screw 67' is adapted to be threaded into contact with the device 75 for securing it against shifting movement in the opening 7.

It will be noted that suitable oil seals 82 are provided for sealing off the housing 70 on the annular member 21, and also seals are provided for sealing off the housing 70' in the FIG. 7 modification, so that if desired an oil bath may be retained within the housing to provide lubrication and cooling as the device is operated. Both the housing 70 and housing 70' are sealed off to protect the bearing 65 and the connection of the housing and indicating means from any liquid or other substance which may drop off line 4 as it moves through the device.

In FIG. 7, the form of the housing 70 is illustrated at 70', and it will be noted that the shaft 74' is connected to the housing 70' and rotates therewith. The shaft 74' is in turn connected to an odometer 80 and the amount of wire line passing between the spring loaded roller 19 and the annular ring 55 is instrumentally measured by means of the odometer 80 and read directly on the face thereof.

Under some circumstances it may be desirable to use a guide roller as illustrated in FIG. 8 wherein the outer surface thereof is substantially flat as indicated at 90. If a form of roller as indicated in FIG. 8 is used, it is desirable, if not necessary, that the two upper rollers 33 and 30 be grooved as shown at 34 in FIG. 3 so as to maintain the wire 4 aligned longitudinally as it is conducted through the frame.

In FIG. 9 the frame 3 is illustrated at 3'. The outer end 9" of the arm 9' and the outer end of the other arm (not shown) corresponding to the arm 8 are each constructed so that the upper rollers carried thereby may be spring loaded. For example the arm 9' may consist of two portions 9''' and 9'''' which are pivotally connected together as illustrated at 9a. The end 9b of arm portion 9''' may be beyond the opening 16 for the lower roller. A pin 9c extends through 9''' and through 9'''' and is held in engagement therewith in any suitable manner so as to pivotally connect them together and spring 9d on pin 9c tends to continually urge the portion 9'''' in a direction so that the upper roller carried in opening 15 will be continually urged against the line 4. The arm (not shown) connected to the arm 9' and corresponding to the arm 8 may be constructed in a similar manner to the arm 9' so that all of the upper rollers are continually urged downwardly against the line 4 so that the line 4 is thereby urged against the lower rollers 31, 32 and the ring 55. The spring mounted rollers 30, 33 and 19 would be urged against the line with small enough force so that no damage is done thereto but with sufficient force to properly align the line 4 in frame 3 so as to obtain a true linear measurement of the line as it moves through the device.

This construction also permits the device to be used on various diameter line without any substantial adjustment since the spring loaded rollers will spring open to accommodate line of any diameter.

From the foregoing description, it can be seen that the arrangement of the rollers on the arms 8 and 9 and the arrangement of the spring loaded roller 19 and ring 55 is such that the line 4 is aligned longitudinally of or horizontally in the device as it moves therethrough, and the line 4 is maintained at a predetermined spacing relative to the frame 3. In other words, the line 4 is maintained in a predetermined vertical plane and a predetermined horizontal plane. Also, the rollers on the top side of the line contact the line in a straight path, as do the rollers and the ring 55 on the bottom side of the line so as to inhibit bending or deflection of the wire line as it passes through the device.

While it is believed that the operation and description of the invention are apparent by reason of the foregoing, to further amplify and describe, it will be assumed that a line 4 of a predetermined diameter is to be lowered into an oil well, or some other remote location to a predetermined depth. The rollers 30 and 31, as well as the rollers 32 and 33 are adjusted by moving the eccentrics 27 on the pins or shafts 25 so that the line 4 is contacted and supported in the manner as previously described relative to the device 2. Also the ring 55 is adjusted by releasing clamps 61' and 61'' whereupon the ring 55 may be threaded relative to the annular member 21 so as to properly contact the line 4 and line it up with each of the guide rollers on either side thereof which contact the line on the nether side thereof. After the ring 55 has been adjusted, the clamp means 61' and 61'' may be tightened so as to lock the ring 55 on the annular member 21 to rotate therewith. The tension of spring 47 is adjusted so that the roller 19 contacts the line 4 in the proper manner in alignment with the upper rollers on each side thereof, and so as to urge the wire line 4 into engagement with the serrations on the ring 55.

When the line 4 moves through the device, the ring 55 is rotated as is the annular member 21 connected therewith. This in turn rotates the housing or bracket 70 so as to transmit rotation of the ring 55 as an indication of movement of the line 4. By reason of the arrangement and support of the line 4 in the device 2, movement of the ring 55 is an accurate indication of the number of lineal feet of wire line passing through the device. This movement may be transmitted to the motor 75 so as to generate an electromotive force, and to in turn transmit the electrical impulses to a remote location for indicating the amount of wire line, or for operating other equipment in relation to, or in synchronism with movement of the wire line 4.

Under some circumstances it may be desired merely to accurately indicate or measure the amount of wire line and in this event the odometer 80 may be used to instrumentally measure the wire line.

After the member 21 has been adjusted to yield an accurate measurement, it may be necessary to recalibrate as wear occurs in ring 55. When the form of frame 3 is used as illustrated at 3' in FIG. 9, the device may readily be used on cable of any diameter without any substantial adjustment, since the spring loaded rollers will spring open to accommodate any diameter cable, and since the lower rollers will retain their proper alignment until wear occurs in ring 55.

Broadly the invention relates to a device for supporting and guiding a line for measuring, or for indicating and transmitting the indication of movement of the line, which device may be readily adjusted to accommodate line of any predetermined diameter or size.

What is claimed is:

1. A device for indicating the longitudinal movement of a line comprising a frame, a pair of guide means thereon and longitudinally spaced from each other for supporting the line for longitudinal movement relative to said frame, each of said guide means having means therewith for preventing lateral movement of the line as the line moves longitudinally from one of said guide means to the other, a measuring roller and a contact roller mounted on said frame between said pair of guide means and contacting the line and movable when the line moves, an indicating means operatively connected with said measuring roller for indicating longitudinal movement of the line, said measuring roller and said contact roller having their axes of rotation in a plane which is substantially perpendicular to the direction of the longitudinal movement of said line, and means to independently adjust said guide means and said contact roller for line of any predetermined diameter.

2. The combination recited in claim 1, wherein said indicating means comprises a device for measuring the amount of longitudinal movement of the line.

3. The combination recited in claim 1, wherein said indicating means comprises a means movable by said contacting means to generate an electromotive force.

4. A device for measuring longitudinal movement of a line comprising a rigid frame, said frame having a central portion and a pair of arms secured thereon against pivotal movement and extending in opposite directions from said central portion, two pairs of guide rollers each pair of which includes an upper roller and a lower roller mounted on each of said arms for supporting the line therebetween as the line moves longitudinally from one pair of guide rollers to the other, each of said rollers having an annular surface engaging said line, an annular member rotatably mounted on said central portion and including an edge portion for contacting the line, means mounting and maintaining said annular member on said central portion and said lower rollers on said arms to position said edge portion of said annular member and said annular surfaces of said lower rollers in the same longitudinal plane, a spring loaded roller engaging the line and urging it into contact with said edge portion whereby movement of the line rotates said member, coacting means on said annular member and said edge portion for moving said edge portion laterally relative to said annular member to vary the spacing therebetween for receiving line of various predetermined diameters therebetween, and means operatively connected to said annular member for measuring the amount of movement of said member as a measurement of the amount of line passing between said spring loaded roller and edge portion.

5. A device for measuring longitudinal movement of a line comprising a rigid frame, said frame having a central portion and a pair of arms secured thereon against pivotal movement and extending in opposite directions from said central portion, two pairs of guide rollers each pair of which includes an upper roller and a lower roller mounted on each of said arms for supporting the line therebetween as the line moves longitudinally from one pair of guide rollers to the other, each of said rollers having an annular surface engaging said line, an annular member rotatably mounted on said central portion and including an edge portion for contacting the line, means mounting and maintaining said annular member on said central portion and said lower rollers on said arms to position said edge portion of said annular member and said annular surfaces of said lower rollers in the same longitudinal plane, a spring loaded roller engaging the line and urging it into contact with said edge portion whereby movement of the line rotates said member, means operatively connected to said annular member for measuring the amount of movement of said member as a measurement of the amount of line passing between said spring loaded roller and edge portion, said annular member and said edge portion having cooperating means for moving them relative to each other, and said guide rollers on each of said arms including adjustment means to vary the spacing therebetween for receiving line of various predetermined diameters therebetween.

6. A device for measuring a line comprising a frame, said frame having a central portion, an arm on each side thereof extending outwardly and upwardly relative to said central portion, said arms being in substantially the same vertical plane, upper and lower guide rollers mounted on each of said arms for supporting the line in said frame, an annular member rotatably mounted on said central portion, a split ring carried by said member for engaging the line, a spring loaded roller carried by said central portion and urging the line into contact with said split ring, said member and split ring having tapered mutually engaging matching threaded surfaces whereby said ring may be moved relative to said member to vary the spacing between said ring and said spring loaded roller for accommodating a line of a predetermined diameter, said guide rollers on each of said arms having eccentric shafts whereby the vertical spacing and horizontal alignment of the rollers may be changed, and means connected to move with said member as the line moves between said member and said spring loaded roller for measuring the amount of line moved between said member and said spring loaded roller.

7. The combination recited in claim 6, wherein the upper guide roller on each arm is grooved and aligned longitudinally of the axis of the line to inhibit lateral movement of the line.

8. The combination recited in claim 6, wherein all of said rollers are grooved for receiving the line therein, said rollers being mounted in the same vertical plane and aligned in the same plane longitudinally of said frame to inhibit deflection of the line as it moves relative to said frame.

9. A device for indicating movement of a line comprising, a frame, said frame having a central portion, an arm on each side thereof extending outwardly and upwardly relative to said central portion, said arms being in substantially the same vertical plane, upper and lower guide rollers mounted on each of said arms for supporting the line in said frame, an annular member rotatably mounted on said central portion, a split ring carried by said member for engaging the line, a spring loaded roller carried by said central portion and urging the line into contact with said split ring, said member and split ring having tapered mutually engaging matched threaded surfaces whereby said ring may be moved relative to said member, said guide rollers on each of said arms having eccentric shafts whereby the vertical spacing and horizontal alignment of the rollers may be changed to receive a line of any predetermined diameter, a ring gear carried by said member, a pinion engaged with said ring gear, a shaft on which said pinion is mounted, and a motor operatively connected with said shaft and mounted in said central portion of said frame, said motor transmitting an electrical impulse as the line rotates said member and shaft connected therewith as an indication of movement of the line.

10. The combination recited in claim 9, wherein the upper guide roller on each arm is grooved and aligned longitudinally of the axis of the line to inhibit lateral movement of the line.

11. The combination recited in claim 9, wherein all of said rollers are grooved for receiving the line therein, said rollers being mounted in the same vertical plane and aligned in the same plane longitudinally of said frame to inhibit deflection of the line as it moves relative to said frame.

References Cited in the file of this patent

UNITED STATES PATENTS

| | | |
|---|---|---|
| 1,639,973 | Van Orstrand | Aug. 23, 1927 |
| 1,651,643 | St. Clair | Dec. 6, 1927 |
| 2,060,233 | Mathey et al. | Nov. 10, 1936 |
| 2,166,212 | Hayward | July 18, 1939 |
| 2,250,076 | Harley et al. | July 22, 1941 |
| 2,269,573 | Barry | Jan. 13, 1942 |
| 2,876,549 | Adamson et al. | Mar. 10, 1959 |

FOREIGN PATENTS

| | | |
|---|---|---|
| 891,601 | France | Dec. 11, 1943 |